US009103267B2

(12) United States Patent
Levijoki et al.

(10) Patent No.: US 9,103,267 B2
(45) Date of Patent: Aug. 11, 2015

(54) LOW COOLANT TEMPERATURE FAULT DIAGNOSTIC SYSTEMS AND METHODS

(76) Inventors: Stephen Paul Levijoki, Swartz Creek, MI (US); John W. Siekkinen, Novi, MI (US); Nicholas Sup, Commerce Township, MI (US); Eric E. Klauser, Orchard Lake, MI (US)

( * ) Notice: Subject to any disclaimer, the term of this patent is extended or adjusted under 35 U.S.C. 154(b) by 278 days.

(21) Appl. No.: 13/606,619

(22) Filed: Sep. 7, 2012

(65) Prior Publication Data
US 2014/0019026 A1 Jan. 16, 2014

Related U.S. Application Data

(60) Provisional application No. 61/671,337, filed on Jul. 13, 2012.

(51) Int. Cl.
| | |
|---|---|
| F01P 11/16 | (2006.01) |
| F02D 41/22 | (2006.01) |
| F01P 11/14 | (2006.01) |
| F02D 41/06 | (2006.01) |
| F02D 41/12 | (2006.01) |

(52) U.S. Cl.
CPC ............... F01P 11/16 (2013.01); F02D 41/22 (2013.01); *F01P 11/14* (2013.01); *F02D 41/068* (2013.01); *F02D 41/123* (2013.01); *F02D 2041/228* (2013.01); *F02D 2200/021* (2013.01); *Y02T 10/40* (2013.01)

(58) Field of Classification Search
CPC ............... F01P 11/14–11/16; F02D 11/105; F02D 41/123; F02D 41/022
USPC .................. 701/102, 110, 112, 115, 114; 123/198 C, 198 DB, 41.01, 41.05, 41, 2, 123/41.08, 41.31, 41.56, 41.57, 41.12
See application file for complete search history.

(56) References Cited

U.S. PATENT DOCUMENTS

| | | | | |
|---|---|---|---|---|
| 5,359,969 | A * | 11/1994 | Dickrell et al. | 123/41.12 |
| 6,907,343 | B2 * | 6/2005 | Tsukamoto et al. | 701/114 |
| 6,925,376 | B2 * | 8/2005 | Li et al. | 701/114 |
| 7,804,047 | B2 * | 9/2010 | Zak et al. | 219/494 |
| 7,921,705 | B2 * | 4/2011 | Hamama et al. | 73/114.68 |
| 2004/0181333 | A1 * | 9/2004 | Tsukamoto et al. | 701/114 |
| 2005/0077368 | A1 * | 4/2005 | Zak et al. | 237/19 |
| 2010/0058848 | A1 | 3/2010 | Hamama et al. | |
| 2010/0082220 | A1 * | 4/2010 | Whitney et al. | 701/102 |

FOREIGN PATENT DOCUMENTS

DE 102009040548 A1 5/2010

OTHER PUBLICATIONS

U.S. Appl. No. 14/044,141, filed Oct. 2, 2013, Levijoki et al.

* cited by examiner

*Primary Examiner* — Stephen K Cronin
*Assistant Examiner* — Susan E Scharpf (57) ABSTRACT

A diagnostic system for a vehicle includes a comparison module, a disabling module, and a fault indication module. The comparison module indicates whether a temperature of engine coolant is less than a first predetermined temperature. The disabling module disables the comparison module until the temperature of the engine coolant is greater than a second predetermined temperature. The fault indication module diagnoses a fault in response to the comparison module indicating that the temperature of the engine coolant is less than the first predetermined temperature.

18 Claims, 4 Drawing Sheets

LOW COOLANT TEMPERATURE FAULT DIAGNOSTIC SYSTEMS AND METHODS

CROSS-REFERENCE TO RELATED APPLICATIONS

This application claims the benefit of U.S. Provisional Application No. 61/671,337, filed on Jul. 13, 2012. The disclosure of the above application is incorporated herein by reference in its entirety.

FIELD

The present disclosure relates to internal combustion engines and more particularly to low engine coolant temperature diagnostic systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine of a vehicle combusts an air/fuel mixture within cylinders to generate torque. Combustion also generates a significant amount of heat. A coolant pump circulates engine coolant through coolant channels within the engine. A radiator is connected to the coolant channels. A thermostat opens or is opened to allow the coolant pump to circulate the engine coolant through the coolant channels and the radiator. The function of the thermostat can also be performed by a variable speed electric pump, an electrically controlled valve, etc.

The engine coolant absorbs heat from the engine. The engine coolant may carry heat to the radiator. The radiator transfers heat from the engine coolant to air passing the radiator. The cooled engine coolant can then be circulated back to the engine to cool the engine.

Little or no air may pass the radiator when the vehicle is stationary or moving slowly. Accordingly, the engine coolant may be unable to release heat when the vehicle is stationary or moving slowly. A cooling fan may be selectively turned ON to draw air past the radiator. By increasing the airflow passing the radiator, the cooling fan may increase heat transfer from the engine coolant within the radiator to the air passing the radiator. Excessive heat may reduce the reliability and/or shorten the lifetime (i.e., period of reliable use) of the engine and/or one or more engine components.

SUMMARY

A diagnostic system for a vehicle includes a comparison module, a disabling module, and a fault indication module. The comparison module indicates whether a temperature of engine coolant is less than a first predetermined temperature. The disabling module disables the comparison module until the temperature of the engine coolant is greater than a second predetermined temperature. The fault indication module diagnoses a fault in response to the comparison module indicating that the temperature of the engine coolant is less than the first predetermined temperature.

A diagnostic method for a vehicle includes: indicating whether a temperature of engine coolant is less than a first predetermined temperature; and disabling the indication of whether the temperature of the engine coolant is less than the first predetermined temperature until the temperature of the engine coolant is greater than a second predetermined temperature. The diagnostic method further includes: diagnosing a fault in response to the indication that the temperature of the engine coolant is less than the first predetermined temperature.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Engine coolant absorbs heat produced by an engine. A coolant pump circulates the engine coolant throughout an engine system for various heating and cooling purposes. For example only, the coolant pump pumps warm coolant from the engine to a radiator for engine cooling. The coolant pump also pumps warm coolant from the engine to a heater core to warm a passenger cabin of a vehicle.

Once the coolant is warm, a control module selectively diagnoses a low coolant temperature fault. The control module diagnoses a low coolant temperature fault when a temperature of the coolant is less than a predetermined temperature. A low coolant temperature fault may be attributable to, for example, a thermostat being stuck open such that the coolant is unexpectedly being cooled or being cooled more than expected.

The control module disables the diagnosis of a low coolant temperature fault when the coolant temperature is expected to decrease and may become less than the predetermined temperature. For example, the control module disables the diagnosis of a low coolant temperature fault during fuel cutoff. Additionally or alternatively, the control module disables the diagnosis of a low coolant temperature fault when power production of the engine is less than a predetermined power. The control module also disables the diagnosis of a low coolant temperature fault after such conditions end to allow the coolant to warm back up. Disabling the diagnosis may prevent the control module from erroneously diagnosing the presence of a low coolant temperature fault.

Figure 1A:
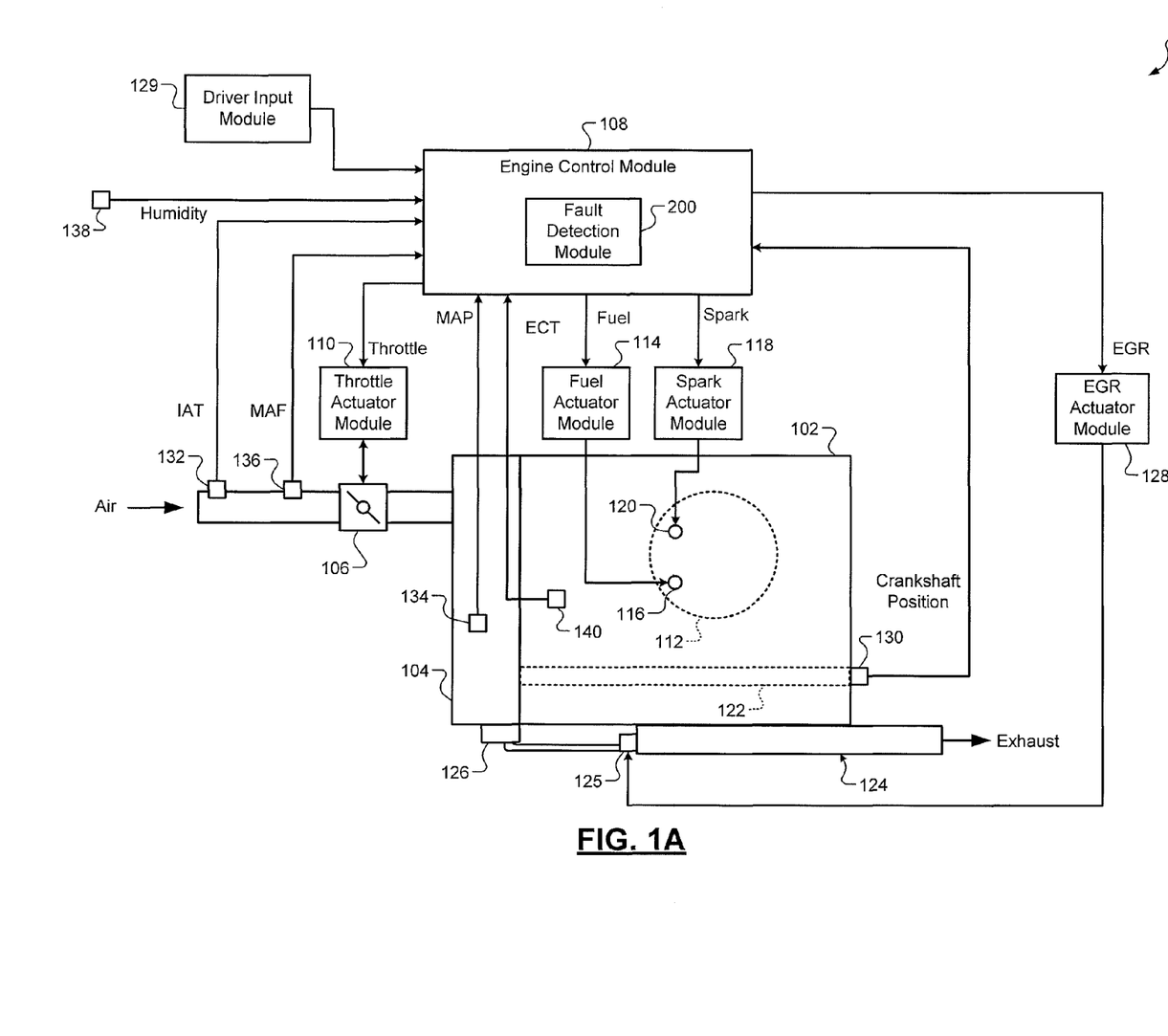
FIGS. 1A-1B are functional block diagrams of an example engine system according to the present disclosure.
Figure 1B:
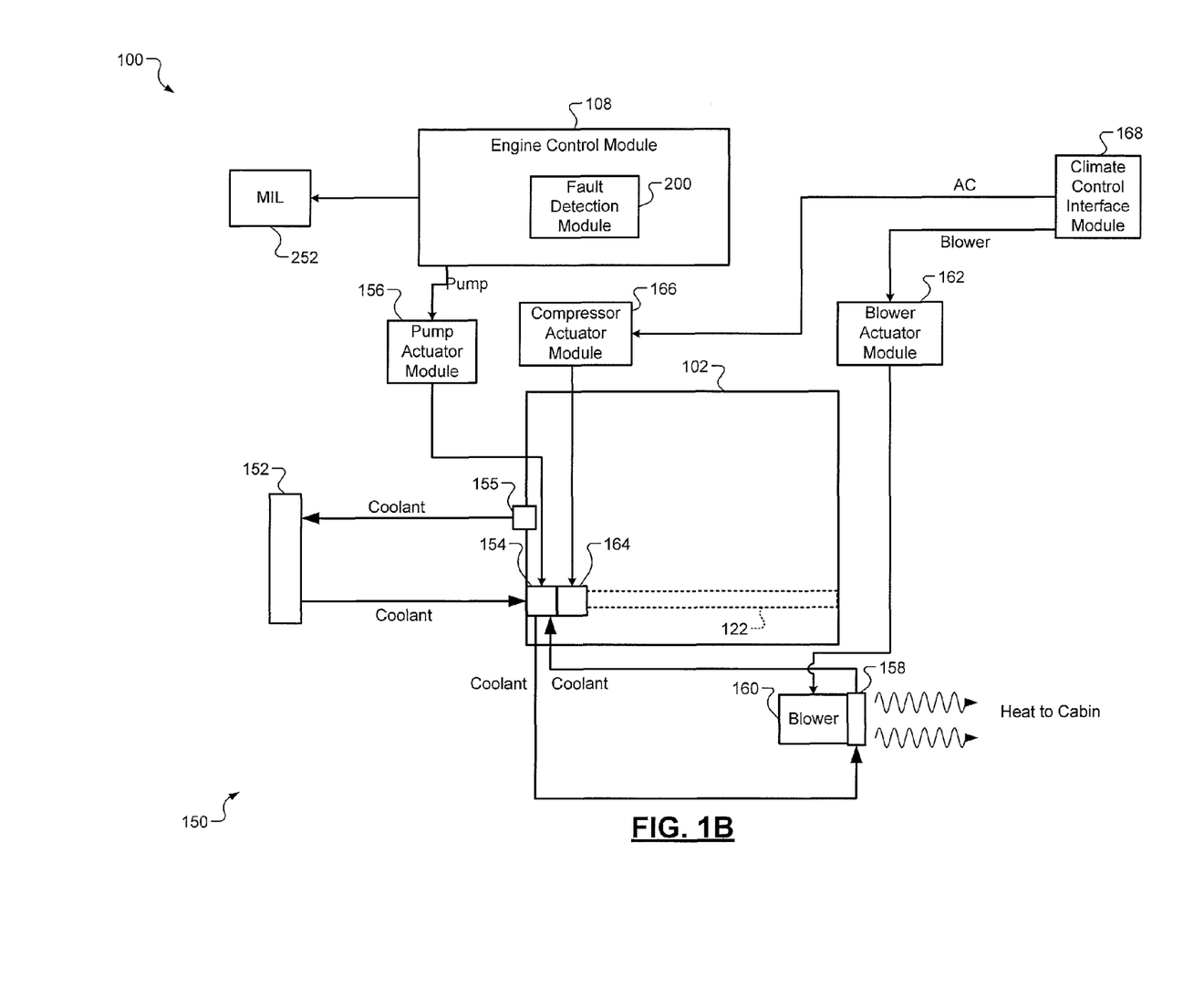

Referring now to FIGS. 1A-1B, functional block diagrams of an example engine system 100 are presented. The engine system 100 includes an engine 102 that combusts an air/fuel mixture to produce drive torque for a vehicle. While a spark ignition, gasoline-type engine will be described, the present disclosure is applicable to other types of torque producers, such as ethanol and methanol combusting engines, diesel-type engines, fuel cell engines, propane engines, and hybrid-type engines. Torque produced by the engine 102 could be used to drive a generator to charge one or more batteries, to drive one or more electric motors, and/or for one or more other suitable purposes.

Air may be drawn into an intake manifold 104 through a throttle valve 106. For example only, the throttle valve 106 may include a butterfly valve having a rotatable blade. An engine control module (ECM) 108 controls a throttle actuator module 110, and the throttle actuator module 110 regulates opening of the throttle valve 106 to control the amount of air drawn into the intake manifold 104. Air from the intake manifold 104 is drawn into cylinders of the engine 102. While the engine 102 may include multiple cylinders, only a single cylinder 112 is shown. For example only, the engine 102 may include 2, 3, 4, 5, 6, 8, 10, and/or 12 cylinders.

The ECM 108 controls a fuel actuator module 114, which regulates fuel injected by a fuel injector 116. For example, the amount of fuel injected may be regulated to achieve a desired air/fuel ratio. Fuel may be injected into the intake manifold 104 at a central location or at multiple locations, such as near an intake valve (not shown) associated with each of the cylinders. Additionally or alternatively, fuel may be injected directly into the cylinders.

Injected fuel mixes with air and creates an air/fuel mixture. A piston (not shown) within the cylinder 112 compresses the air/fuel mixture. Based upon a signal from the ECM 108, a spark actuator module 118 energizes a spark plug 120 in the cylinder 112. The spark ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft 122. Once the piston reaches a bottommost position, referred to as bottom dead center (BDC), the piston begins moving up again to expel the byproducts of combustion from the cylinder 112. The byproducts of combustion are exhausted from the vehicle via an exhaust system 124. The ECM 108 may control the spark actuator module 118 by specifying how far before or after TDC the spark should be provided. Operation of the spark actuator module 118 may therefore be synchronized with rotation of the crankshaft 122.

The engine system 100 may include an exhaust gas recirculation (EGR) valve 125. The EGR valve 125 selectively circulates exhaust gas back to the intake manifold 104. An EGR cooler 126 may be implemented to cool the exhaust gas before the exhaust gas is input to the intake manifold 104. An EGR actuator 128 controls opening of the EGR valve 125 based on signals from the ECM 108.

Startup and shutdown commands for the engine 102 are relayed to the ECM 108 by a driver input module 129. An engine startup command may be generated based on, for example, actuation of an ignition key and/or one or more buttons. A starter (not shown) drives rotation of the crankshaft 122 when an engine startup command is received. The driver input module 129 also relays other driver inputs to the ECM 108, such as accelerator pedal position(s), brake pedal position(s), cruise control inputs, and other driver inputs.

A speed of the crankshaft 122 in revolutions per minute (rpm) may be measured using a crankshaft position sensor 130. The crankshaft position sensor 130 generates a crankshaft position signal based on rotation of the crankshaft 122. For example only, the crankshaft position sensor 130 may include a variable reluctance (VR) sensor or another suitable type of crankshaft position sensor.

The temperature of ambient air being drawn into the engine 102 may be measured using an intake air temperature (IAT) sensor 132. The pressure within the intake manifold 104 may be measured using a manifold absolute pressure (MAP) sensor 134. In some implementations, engine vacuum may be measured where the engine vacuum is based on a difference between ambient air pressure and the pressure within the intake manifold 104.

The mass flow rate of air flowing into the intake manifold 104 may be measured using a mass air flow (MAF) sensor 136. In some implementations, the MAF sensor 136 may be located in a housing that also includes the throttle valve 106. Humidity of the ambient air may be measured using a humidity sensor 138. For example only, the humidity sensor 138 may measure relative humidity of the ambient air. Temperature of engine coolant may be measured by an engine coolant temperature (ECT) sensor 140. In various implementations, the temperature of the engine coolant may be determined based on one or more other measured parameters.

The ECM 108 may communicate with other vehicle systems to coordinate operation of the engine system 100 with those vehicle systems. For example only, the ECM 108 may communicate with a transmission control module (not shown) to coordinate operation of the engine 102 with operation (e.g., gear shifts) of a transmission and/or a hybrid control module (not shown) to coordinate operation of the engine 102 and one or more electric motors.

As shown in FIG. 1B, the engine system 100 also includes a heating and cooling system 150. Engine coolant is circulated throughout the engine system 100 for various heating and cooling purposes. For example only, warm coolant is circulated away from the engine 102 to cool the engine 102. Warm coolant is also circulated for warming of a passenger cabin of the vehicle. Warm coolant may be maintained within the engine 102 under some circumstances, for example, to warm the engine 102.

Coolant circulates through various coolant passages (not shown) within the engine 102. For example only, the engine 102 may include coolant passages through cylinder head(s) and a cylinder block of the engine 102. Coolant is transferred from the engine 102 to a radiator 152 to transfer heat away from the engine 102. More specifically, the coolant absorbs heat from the engine 102, and the heat is later transferred to air passing the radiator 152.

A coolant pump 154 circulates coolant between the engine 102 and the radiator 152 when a thermostat 155 is open. The thermostat 155 is selectively opened to facilitate coolant flow between the engine 102 and the radiator 152. For example only, the thermostat 155 may open when the temperature of coolant within the engine 102 exceeds a predetermined opening temperature (e.g., approximately 80 degrees Celsius). While the thermostat 155 is shown as being an outlet-side thermostat, the thermostat 155 may be an inlet-side thermostat. In various implementations, the thermostat 155 may include an electrically actuated thermostat, and opening of the thermostat 155 (e.g., duty cycle, open area, etc.) may be controlled by the ECM 108. The function of the thermostat 155 can also be performed by a variable speed electric pump, an electrically controlled valve, etc.

The coolant pump 154 may be a mechanical pump that is driven by the engine 102, such as by rotation of the crankshaft 122. Mechanical coolant pumps include switchable pumps and continuously driven pumps. A switchable coolant pump includes a clutch or other friction device that is actuated to selectively engage and disengage the coolant pump from the engine 102. Switchable coolant pumps may be disengaged, for example, to disable the circulation of coolant throughout the engine system 100. In various implementations, the coolant pump 154 may be an electrical pump that is driven by an electric motor. A pump actuator module 156 may control the coolant pump 154 based on pump signals from the ECM 108.

The coolant pump 154 also controls circulation of coolant to a cabin heating element 158 (e.g., a heater core). The coolant transfers heat to air passing the cabin heating element 158. A blower 160 transfers air across the cabin heating element 158 into the passenger cabin of the vehicle. Heat from the coolant within the cabin heating element 158 is transferred to air, and the air transfers the heat into the passenger cabin to warm the passenger cabin. A blower actuator module 162 controls operation of the blower 160 based on blower signals from a climate control interface module 168.

The vehicle may also include an air conditioning system that adjusts temperature of the passenger cabin. The air conditioning system may be operated to, for example, cool or defrost the passenger cabin. The air conditioning system includes an air conditioner (AC) unit 164 that is driven by the engine 102. The AC unit 164 also includes a clutch or other friction device that allows the AC unit 164 to be selectively disengaged from the engine 102. The blower 160 may also transfer air across an evaporator of the AC unit 164 and into the passenger cabin of the vehicle. Air passing the evaporator is cooled to cool the passenger cabin.

A compressor actuator module 166 controls the AC clutch based on AC signals from the ECM 108 and/or the climate control interface module 168. The climate control interface module 168 may include one or more knobs, buttons, and/or other suitable devices through which the user may request adjustments to the temperature of the passenger cabin and defrost. The ECM 108 controls the coolant pump 154 and the AC unit 164 based on the user inputs to the climate control interface module 168.

The ECM 108 of the present disclosure includes a fault detection module 200 (see also FIG. 2) that diagnoses whether a low coolant temperature fault is present. The fault detection module 200 diagnoses the presence of a low coolant temperature fault when the ECT becomes less than a predetermined temperature when the ECT temperature should be greater than the predetermined temperature. A low coolant temperature fault may be attributable to, for example, the thermostat 155 being stuck open such that coolant is being circulated to and cooled within the radiator 152.

Figure 2:
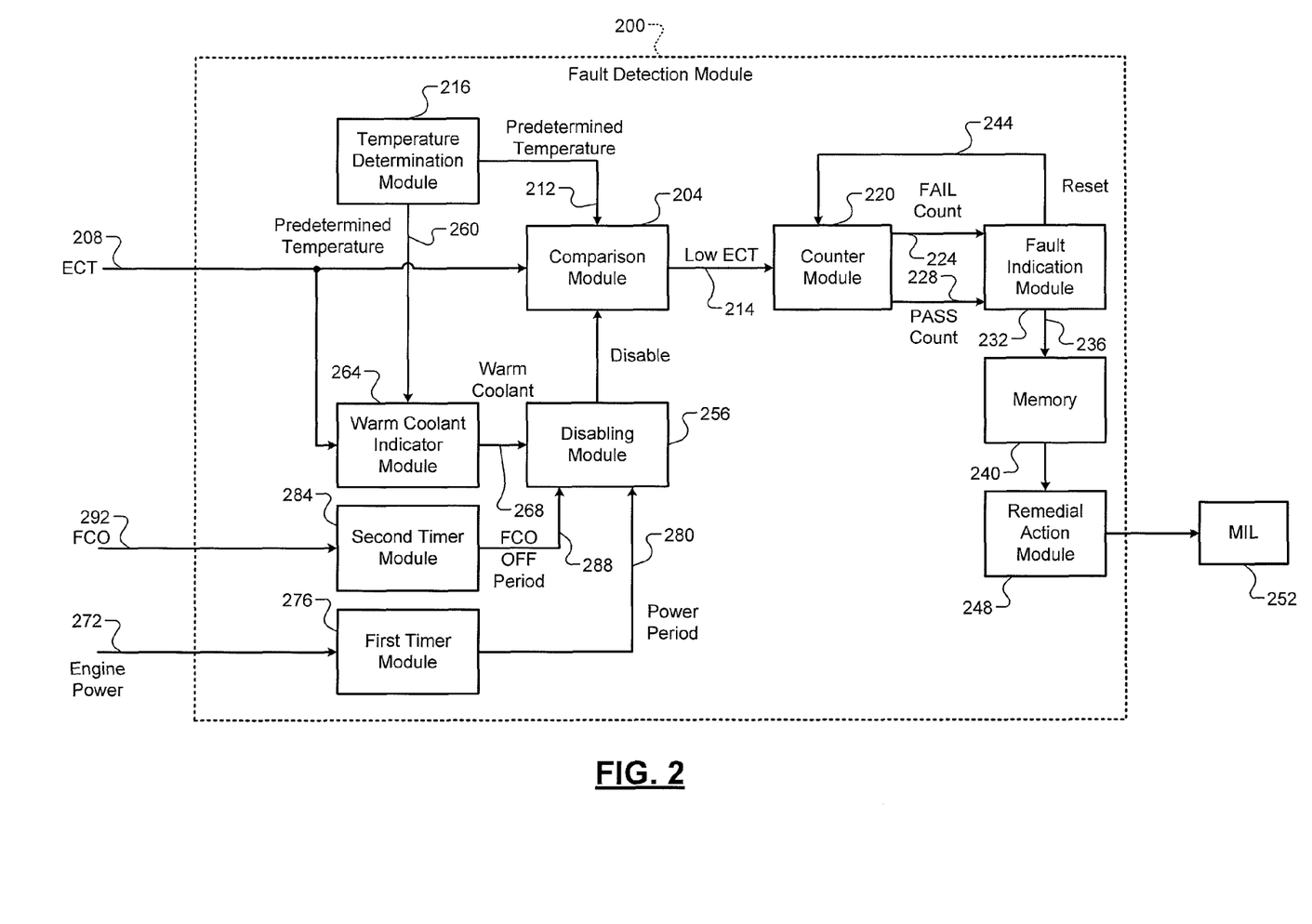
FIG. 2 is a functional block diagram of an example portion of an engine control module according to the present disclosure.

The fault detection module 200 delays the diagnosis of whether a low coolant temperature fault is present for a predetermined period after the occurrence of an engine operating condition that may cause the ECT to fall below the predetermined temperature. For example, the fault detection module 200 delays the diagnosis of whether a low coolant temperature fault is present during a fuel cutoff event and for a predetermined period after the FCO event ends. The fault detection module 200 also delays the diagnosis of whether a low coolant temperature fault is present while power produced by the engine 102 is low and for a predetermined period after the low power condition ends. Delaying the diagnosis under such circumstances may prevent the fault detection module 200 from erroneously diagnosing a low coolant temperature fault during and after times when the ECT is expected to decrease.

Referring now to FIG. 2, a functional block diagram of an example portion of the ECM 108 including the fault detection module 200 is presented. When enabled, a comparison module 204 compares an ECT 208 with a first predetermined temperature 212 and generates a low ECT signal 214 based on the comparison. The ECT 208 may be measured using the ECT sensor 140 or determined based on one or more other measured parameters.

The first predetermined temperature 212 may be a fixed value or a variable value. For example only, the first predetermined temperature 212 may be approximately 65 degrees Celsius (° C.) or another suitable temperature. When the first predetermined temperature 212 is a variable value, a temperature determination module 216 may determine the first predetermined temperature 212. The temperature determination module 216 may determine the first predetermined temperature 212, for example, based on a flow rate of the engine coolant, an opening of the thermostat 155, and/or one or more other suitable parameters. The temperature determination module 216 may determine the first predetermined temperature 212 using a function or a mapping.

When the ECT 208 is less than the first predetermined temperature 212, the comparison module 204 may set the low ECT signal 214 to a first state. The comparison module 204 may set the low ECT signal 214 to a second state when the ECT 208 is greater than the first predetermined temperature 212.

A counter module 220 selectively increments a first (FAIL) count (value) 224 and/or a second (PASS) count (value) 228 based on the low ECT signal 214. For example, the counter module 220 increments the second count 228 and does not increment the first count 224 when the low ECT signal 214 is set to the second state. When the low ECT signal 214 is set to the first state, the counter module 220 increments both the first count 224 and the second count 228. The first count 224 therefore tracks the number of times (control loops) that the comparison module 204 indicated that the ECT 208 is less than the first predetermined temperature 212 since the first count 224 was last reset. The second count 228 tracks the total number of times that the comparison module 204 performed the comparison since the second count 228 was last reset.

A fault indication module 232 selectively diagnoses a low coolant temperature fault based on the first count 224 and/or the second count 228. For example, the fault indication module 232 may diagnose a low coolant temperature fault when the first count 224 is greater than a first predetermined value. The fault indication module 232 may not diagnose a low coolant temperature fault when the second count 228 is greater than a second predetermined value.

The first predetermined value may be set to a first predetermined percentage (e.g., approximately 80 percent) of the second predetermined value. In various implementations, the fault indication module 232 may not indicate a low coolant temperature fault when the second count 228 is greater than a third predetermined value that is set to a second predetermined percentage of the second predetermined value and sum of the first and second predetermined percentages is equal to 100 percent. While detection of a low coolant temperature fault using an X (first count) out of Y (second count) has been described, another suitable way of detecting the presence of the fault when the ECT 208 is less than the first predetermined temperature 212 may be used.

The fault indication module 232 generates a fault signal 236 that indicates whether a low coolant temperature fault has been diagnosed. For example, the fault indication module 232 may set a predetermined diagnostic trouble code (DTC) that is associated with the low coolant temperature fault in memory 240 when a low coolant temperature fault is diagnosed. The low coolant temperature fault may indicate, for example, that the thermostat 155 is stuck open and/or one or more other faults are present that caused the ECT 208 to cool unexpectedly.

The fault indication module 232 also generates a reset signal 244 to reset the second count 228 and the first count 224 once the fault indication module 232 diagnoses whether a low coolant temperature fault is present. The counter module 220 resets both the first count 224 and the second count 228 in response to the generation of the reset signal 244.

A remedial action module 248 takes one or more remedial actions when the fault indication module 232 indicates that a low coolant temperature fault has been diagnosed. For example, the remedial action module 248 illuminates a malfunction indicator lamp (MIL) 252 when the fault indication module 232 indicates that a low coolant temperature fault has been diagnosed. The remedial action module 248 may also take one or more remedial actions to increase the ECT when the fault indication module 232 indicates that a low coolant temperature fault has been diagnosed. For example, the remedial action module 248 may adjust one or more engine operating parameters, such as retarding spark timing, when the fault indication module 232 indicates that a low coolant temperature fault has been diagnosed. This would allow for more heat to the coolant to provide additional warming of the passenger cabin via the cabin heating element 158.

A disabling module 256 enables and disables the comparison module 204. The disabling module 256 disables the comparison module 204 until the ECT 208 is greater than a second predetermined temperature 260. The second predetermined temperature 260 may be a fixed value or a variable value. For example only, the second predetermined temperature 260 may be approximately 70° C. or another suitable temperature. The second predetermined temperature 260 may be less than the first predetermined temperature 212, the same as the first predetermined temperature 212, or greater than the first predetermined temperature 212.

When the second predetermined temperature 260 is a variable value, the temperature determination module 216 may determine the second predetermined temperature 260, for example, based on the flow rate of the coolant, the opening of the thermostat 155, and/or one or more other suitable parameters. The temperature determination module 216 may determine the second predetermined temperature 260 using a function or a mapping.

A warm coolant indicator module 264 compares the ECT 208 and the second predetermined temperature 260. The warm coolant indicator module 264 may generate a warm coolant signal 268 that indicates whether the ECT 208 is greater than the second predetermined temperature 260. For example, the warm coolant indicator module 264 may set the warm coolant signal 268 to an active state when the ECT 208 is greater than the second predetermined temperature 260 and to an inactive state when the ECT 208 is less than the second predetermined temperature 260. Once the ECT 208 becomes greater than the second predetermined temperature 260, the warm coolant indicator module 264 may latch the warm coolant signal 268 in the active state.

The disabling module 256 disables the comparison module 204 until the warm coolant signal 268 transitions to the inactive state. The disabling module 256 may enable the comparison module 204 while the warm coolant signal 268 is in the active state.

The disabling module 256 also disables the comparison module 204: (1) during fuel cutoff (FCO) events and for a predetermined period after a FCO event ends; and (2) while a power 272 of the engine 102 is less than a predetermined power and for a predetermined period after the power 272 becomes greater than the predetermined power. A first timer module 276 resets a power period 280 when the power 272 is less than the predetermined power. The first timer module 276 increments the power period 280 when the power 272 is greater than the predetermined power. In this manner, the power period 280 corresponds to the period that has passed since the power 272 was last less than the predetermined power.

The predetermined power may correspond to a minimum power production of the engine 102 to increase the ECT 208 to greater than the second predetermined temperature 260 under all possible operating conditions. The power 272 corresponds to a current power being produced by the engine 102. The power 272 may be determined, for example, based on a torque being produced by the engine 102 and an engine speed.

The disabling module 256 disables the comparison module 204 when the power period 280 is less than a first predetermined period. The first predetermined period may correspond to an expected period of operation with the power 272 greater than the predetermined power after which the ECT 208 will be greater than a predetermined temperature, such as the first predetermined temperature 212 or the second predetermined temperature 260. In this manner, the disabling module 256 disables the comparison module 204 while the power 272 is less than the predetermined power and for the first predetermined period after the power 272 becomes greater than the predetermined power.

A second timer module 284 resets a FCO OFF period 288 when a fuel cutoff (FCO) event is occurring. FCO events include clutch fuel cutoff (CFCO) events, deceleration fuel cutoff events (DECO), and other events during which fueling to the engine 102 is cut off. The second timer module 284 increments the FCO OFF period 288 when a FCO event is not occurring. In this manner, the FCO OFF period 288 corresponds to the period that has passed since a last FCO event ended. A FCO signal 292 may indicate whether a FCO event is occurring. For example, the FCO signal 292 may be in an active state when a FCO event is occurring and an inactive state when a EGO event is not occurring.

The disabling module 256 disables the comparison module 204 when the FCO OFF period 288 is less than a second predetermined period. The second predetermined period may correspond to an expected period of operation of the engine 102, after the end of a FCO event, when the ECT 208 will be greater than a predetermined temperature, such as the first predetermined temperature 212 or the second predetermined temperature 260. In this manner, the disabling module 256 disables the comparison module 204 during a FCO event and for the second predetermined period after the end of a FCO event.

The disabling module 256 enables the comparison module 204 when the FCO OFF period 288 is greater than the second predetermined period, the power period 280 is greater than the first predetermined period, and the warm coolant signal 268 is in the active state. While incrementing and resetting to zero has been discussed, resetting based on the associated predetermined values and decrementing may be used.

Figure 3:
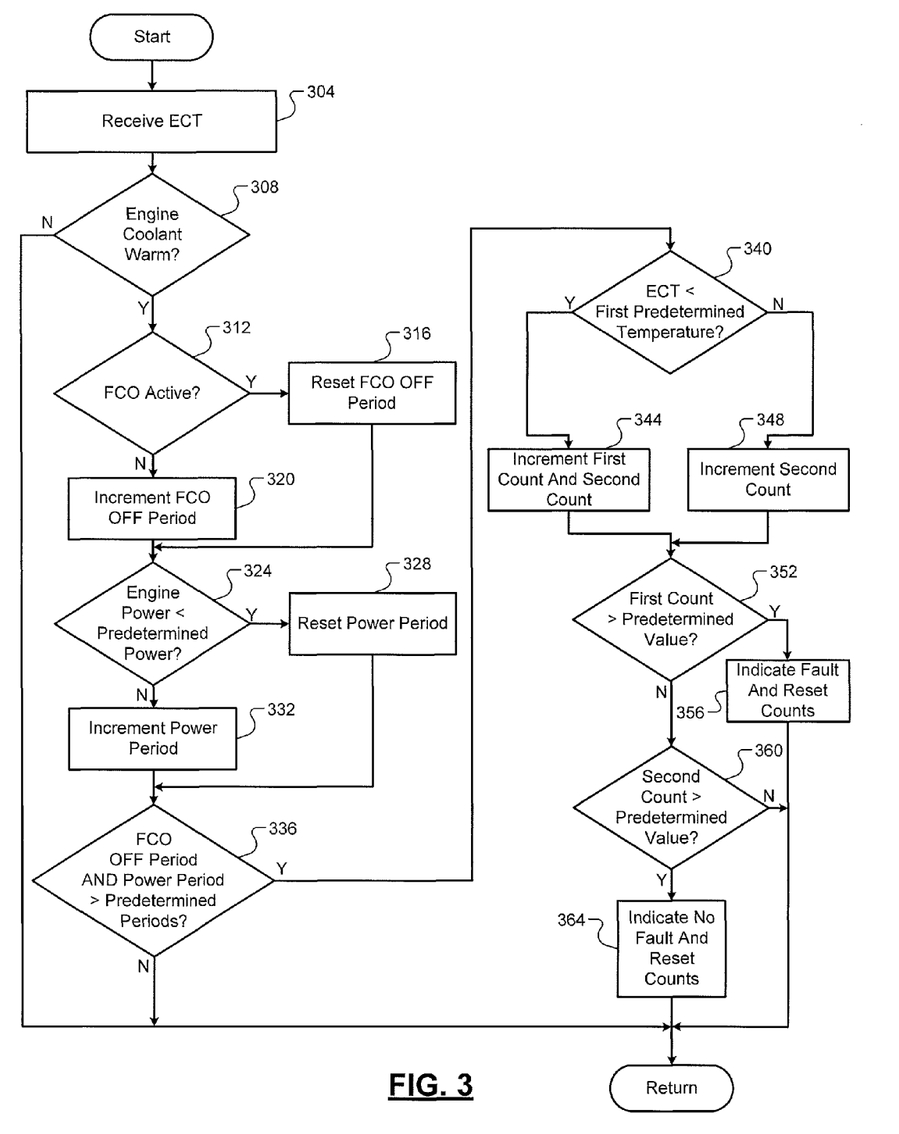
FIG. 3 is a flowchart depicting an example method of selectively diagnosing a low coolant temperature fault according to the present disclosure.

FIG. 3 includes a flowchart depicting an example method of selectively diagnosing a low coolant temperature fault. Referring now to FIG. 3, control may begin with 304 where the ECT 208 is received. At 308, the disabling module 256 determines whether the warm coolant signal 268 is in the active state. The warm coolant indicator module 264 sets and may latch the warm coolant signal 268 in the active state when the ECT 208 is greater than the second predetermined temperature 260. If true, control continues with 312. If false, the disabling module 256 disables the comparison of the ECT 208 with the first predetermined temperature (at 340, below), and control returns to 304. The disabling module 256 may also reset the first count 224 and the second count 228.

At 312, the second timer module 284 determines whether a FCO event is occurring. If true, the second timer module 284 resets the FCO OFF period 288 at 316, and control continues with 324. If false, the second timer module 284 increments the FCO OFF period 288 at 320, and control continues with 324. The first timer module 276 determines whether the power 272 is less than the predetermined power at 324. If true, the first timer module 276 resets the power period 280 at 328, and control continues with 336. If false, control increments the power period 280 at 332, and control continues with 336.

The disabling module 256 determines whether both the power period 280 is greater than the first predetermined period and the FCO OFF period 288 is greater than the second predetermined period at 336. If both are true, control enables the comparison module 204, and continues with 340. If one or both are false, the disabling module 256 disables the comparison of the ECT 208 with the first predetermined temperature (at 340, below), and control returns to 304. The disabling module 256 may also reset the first count 224 and the second count 228.

At 340, the comparison module 204 compares the ECT 208 with the first predetermined temperature 212. More specifically, the comparison module 204 determines whether the ECT 208 is less than the first predetermined temperature 212 at 340. If true, the counter module 220 increments the first count 224 and the second count 228 at 344, and control continues with 352. If false, control increments the second count 228 at 348, and control continues with 352.

At 352, the fault indication module 232 determines whether the first count 224 is greater than the first predetermined value. If true, the fault indication module 232 diagnoses and indicates that a low coolant temperature fault is present at 356, and control may return to 304. For example, control may set the predetermined DTC that is associated with the low coolant temperature fault in memory 240 at 356. Control may also reset the first and second counts 224 and 228 at 356. If false, control may continue with 360. When a low coolant temperature fault is present, the MIL 252 may be illuminated. One or more other remedial actions may be taken when a low coolant temperature fault is present, such as retarding the spark timing to increase the ECT 208.

The fault indication module 232 determines whether the second count 228 is greater than the second predetermined value at 360. If true, control diagnoses and indicates that a low coolant temperature fault is not present at 364, and control returns to 304. Control may also reset the first and second counts 224 and 228 at 364. If false, control returns to 304.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A diagnostic system for a vehicle, comprising:
a comparison module that indicates whether a temperature of engine coolant is less than a first predetermined temperature;
a temperature determination module that determines the first predetermined temperature based on at least one of a flowrate of the engine coolant and an opening of a thermostat;
a disabling module that disables the comparison module until the temperature of the engine coolant is greater than a second predetermined temperature;
a fault indication module that diagnoses a fault in response to the comparison module indicating that the temperature of the engine coolant is less than the first predetermined temperature; and
a remedial action module that illuminates a malfunction indicator lamp (MIL) in response to the fault indication module diagnosing the fault.

2. The diagnostic system of claim 1 wherein the disabling module disables the comparison module, after the temperature of the engine coolant is greater than the second predetermined temperature, when a fuel cutoff (FCO) event occurs.

3. The diagnostic system of claim 2 wherein the disabling module disables the comparison module for a predetermined period after the FCO event ends.

4. The diagnostic system of claim 1 wherein the disabling module disables the comparison module, after the temperature of the engine coolant is greater than the second predetermined temperature, when a deceleration fuel cutoff (DFCO) event occurs.

5. The diagnostic system of claim 1 wherein the disabling module disables the comparison module, after the temperature of the engine coolant is greater than the second predetermined temperature, when a power produced by an engine is less than a predetermined power.

6. The diagnostic system of claim 5 wherein the disabling module disables the comparison module for a predetermined period after the power produced by the engine becomes greater than the predetermined power.

7. The diagnostic system of claim 1 wherein, after the temperature of the engine coolant is greater than the second predetermined temperature, the disabling module disables the comparison module:
- when a fuel cutoff (FCO) event occurs;
- for a first predetermined period after the FCO event ends;
- when a power produced by an engine is less than a predetermined power; and
- for a second predetermined period after the power produced by the engine becomes greater than the predetermined power.

8. The diagnostic system of claim 1 wherein the first predetermined temperature is greater than the second predetermined temperature.

9. The diagnostic system of claim 1 further comprising a remedial action module that selectively adjusts at least one engine operating parameter to increase the temperature of the engine coolant in response to the fault indication module diagnosing the fault.

10. A diagnostic method for a vehicle, comprising:
- indicating whether a temperature of engine coolant is less than a first predetermined temperature;
- determining the first predetermined temperature based on at least one of a flowrate of the engine coolant and an opening of a thermostat;
- disabling the indication of whether the temperature of the engine coolant is less than the first predetermined temperature until the temperature of the engine coolant is greater than a second predetermined temperature;
- diagnosing a fault in response to the indication that the temperature of the engine coolant is less than the first predetermined temperature; and
- illuminating a malfunction indicator lamp (MIL) in response to the diagnosis of the fault.

11. The diagnostic method of claim 10 further comprising disabling the indication of whether the temperature of the engine coolant is less than the first predetermined temperature, after the temperature of the engine coolant is greater than the second predetermined temperature, when a fuel cutoff (FCO) event occurs.

12. The diagnostic method of claim 11 further comprising disabling the indication of whether the temperature of the engine coolant is less than the first predetermined temperature for a predetermined period after the FCO event ends.

13. The diagnostic method of claim 10 further comprising disabling the indication of whether the temperature of the engine coolant is less than the first predetermined temperature, after the temperature of the engine coolant is greater than the second predetermined temperature, when a deceleration fuel cutoff (DECO) event occurs.

14. The diagnostic method of claim 10 further comprising disabling the indication of whether the temperature of the engine coolant is less than the first predetermined temperature, after the temperature of the engine coolant is greater than the second predetermined temperature, when a power produced by an engine is less than a predetermined power.

15. The diagnostic method of claim 14 further comprising disabling the indication of whether the temperature of the engine coolant is less than the first predetermined temperature for a predetermined period after the power produced by the engine becomes greater than the predetermined power.

16. The diagnostic method of claim 10 further comprising, after the temperature of the engine coolant is greater than the second predetermined temperature, disabling the indication of whether the temperature of the engine coolant is less than the first predetermined temperature:
- when a fuel cutoff (FCO) event occurs;
- for a first predetermined period after the FCO event ends;
- when a power produced by an engine is less than a predetermined power; and
- for a second predetermined period after the power produced by the engine becomes greater than the predetermined power.

17. The diagnostic method of claim 10 wherein the first predetermined temperature is greater than the second predetermined temperature.

18. The diagnostic method of claim 10 further comprising selectively adjusting at least one engine operating parameter to increase the temperature of the engine coolant in response to the diagnosis of the fault.

* * * * *

UNITED STATES PATENT AND TRADEMARK OFFICE
CERTIFICATE OF CORRECTION

PATENT NO. : 9,103,267 B2
APPLICATION NO. : 13/606619
DATED : August 11, 2015
INVENTOR(S) : Stephen Paul Levijoki Page 1 of 1

It is certified that error appears in the above-identified patent and that said Letters Patent is hereby corrected as shown below:

Title Page, Item [73] Assignee, insert the following:
--GM Global Technology Operations LLC, Detroit, MI (US)--

Signed and Sealed this
Twenty-fourth Day of May, 2016

Michelle K. Lee
*Director of the United States Patent and Trademark Office*